United States Patent
Yoo (10) Patent No.: US 9,507,028 B1
(45) Date of Patent: Nov. 29, 2016

(54) POSITIONING APPARATUS AND METHOD FOR VEHICLE

(71) Applicant: Hyundai Motor Company, Seoul (KR)

(72) Inventor: Kyung Ho Yoo, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/945,917

(22) Filed: Nov. 19, 2015

(30) Foreign Application Priority Data

Jul. 23, 2015 (KR) .......................... 10-2015-0104618

(51) Int. Cl.
*G01S 19/21* (2010.01)
*G01S 19/40* (2010.01)
*G01S 19/42* (2010.01)
*H04N 5/232* (2006.01)
*G06T 7/00* (2006.01)

(52) U.S. Cl.
CPC ............... *G01S 19/40* (2013.01); *G01S 19/42* (2013.01); *G06T 7/0042* (2013.01); *H04N 5/23238* (2013.01); *G06T 2207/10032* (2013.01)

(58) Field of Classification Search
CPC ..... G01S 19/40; G01S 19/42; G06T 7/0042; G06T 2207/10032; H04N 5/23238
USPC ........................................................ 701/476
See application file for complete search history.

(56) References Cited

U.S. PATENT DOCUMENTS

| | | | | |
|---|---|---|---|---|
| 7,746,343 B1 * | 6/2010 | Charaniya | ........... | G06F 3/04815 345/428 |
| 2009/0322742 A1 * | 12/2009 | Muktinutalapati | ... | G06T 7/0028 345/420 |
| 2010/0027527 A1 * | 2/2010 | Higgins | .................. | H04W 4/18 370/351 |
| 2010/0080551 A1 * | 4/2010 | Chen | ....................... | G01C 11/04 396/310 |
| 2014/0200861 A1 * | 7/2014 | DeVito | ............... | G06F 17/5004 703/1 |
| 2015/0319729 A1 * | 11/2015 | MacGougan | ......... | H04W 4/023 455/456.1 |

FOREIGN PATENT DOCUMENTS

| | | |
|---|---|---|
| JP | 2007-003287 | 1/2007 |
| JP | 3874363 B1 | 1/2007 |
| JP | 2007-108029 | 4/2007 |
| JP | 2008-170214 | 7/2008 |
| JP | 2014-219204 | 11/2014 |
| KR | 10-2013-0072614 A | 7/2013 |
| KR | 10-2013-0089068 A | 8/2013 |
| KR | 10-1442703 B1 | 9/2014 |
| KR | 10-101442703 B1 | 9/2014 |

* cited by examiner

*Primary Examiner* — McDieunel Marc
*Assistant Examiner* — James E Stroud
(74) *Attorney, Agent, or Firm* — Brinks Gilson & Lione (57) ABSTRACT

Provided are positioning apparatuses and methods. One positioning method includes receiving satellite signals transmitted from satellites and capturing an image of a skyline around a vehicle through an image sensor, processing the satellite signals to calculate a vehicle location and satellite locations, calculating locations and heights of buildings included in the image captured by the image sensor on the basis of the user or vehicle location, calculating visibility of the satellites by using the user or vehicle location, the satellite locations, and the locations and heights of the buildings, removing a poor satellite signal among the previously received satellite signals on the basis of the calculated visibility, and re-calculating the user or vehicle location by using the other remaining satellite signals excluding the poor satellite signal.

16 Claims, 8 Drawing Sheets

POSITIONING APPARATUS AND METHOD FOR VEHICLE

CROSS-REFERENCE TO RELATED APPLICATION

This application claims the benefit of priority to Korean Patent Application No. 10-2015-0104618, filed on Jul. 23, 2015, the entire disclosure of which is hereby incorporated by reference.

FIELD

The present disclosure relates to a positioning apparatus and method, and more particularly, to a positioning apparatus and method for accurately measuring a location of a user in a downtown area.

BACKGROUND

The statements in this section merely provide background information related to the present disclosure and may not constitute prior art.

In general, a global navigation satellite system (GNSS) is a system that measures a location of a user using triangulation on the basis of signals received from satellites revolving around the earth. Thus, quality of signals from the satellites greatly affects accuracy of the location of the user, and a high level of location accuracy is provided in an open sky in which signals are easily obtained.

However, positioning performance may be problematic in an environment, like the downtown area or tunnels, in which satellite signals are limited or interrupted. In particular, in the downtown area in a compact mass of high-rise buildings, satellite signals are frequently interrupted, interfered and/or distorted by the high-rise buildings, causing a significant positioning error, which results in a reduction in accuracy of positioning of the GNSS.

SUMMARY

The present disclosure has been made to solve the above-mentioned problems occurring in the prior art while advantages achieved by the prior art are maintained intact.

An aspect of the present disclosure provides a positioning apparatus and method capable of calculating locations and heights of buildings positioned around a vehicle, and re-calculating a location of a user by excluding a satellite signal received from a satellite with poor visibility, thereby enabling accurate positioning even in the downtown area.

According to an exemplary form of the present disclosure, a positioning method includes receiving satellite signals transmitted from satellites and capturing an image of a skyline around a vehicle through an image sensor, processing the satellite signals to calculate a user location and satellite locations, calculating locations and heights of buildings included in the image captured by the image sensor on the basis of the user location, calculating visibility of the satellites by using the user location, the satellite locations, and the locations and heights of the buildings, removing a poor satellite signal among the previously received satellite signals on the basis of the calculated visibility, and re-calculating the user location by using the other remaining satellite signals excluding the poor satellite signal.

The positioning method may further include preprocessing the captured image after the image of the skyline around the vehicle is captured, to remove noise and a background image, and extracting feature points from the preprocessed image to detect a building region.

In the calculating of the locations and heights of the buildings, a reference axis of an azimuth angle within the captured image may be calculated using the satellite signals, and an azimuth angle range of each of the buildings may be calculated on the basis of the reference axis.

In the calculating of the locations and heights of the buildings, a distance from central coordinates of the captured image to the closest feature point, among feature points included in each of the buildings, may be calculated for each of the buildings.

In the calculating of visibility of the satellites, visibility of the satellites disposed up in the sky may be determined on the basis of the user location.

In the removing of a poor satellite signal, a satellite signal transmitted from a satellite not secured in visibility, among the satellite signals used for calculating the user location may be excluded.

According to another exemplary form of the present disclosure, a positioning apparatus includes a signal receiver configured to receive satellite signals through an antenna, a signal processor configured to calculate a user location and satellite locations by using the satellite signals, an image sensor configured to capture an image of a skyline around a vehicle, an image processor configured to calculate locations and heights of buildings within the captured image on the basis of the user location, and a processor configured to calculate visibility of satellites positioned up in the sky on the basis of the user location, the satellite locations, and the locations and heights of the buildings, remove a poor satellite signal from the received satellite signals on the basis of the calculated visibility, and re-calculate the user location.

The image sensor may be a super wide angle camera equipped with a wide angle lens.

The satellite locations may include an elevation angle and an azimuth angle of their respective corresponding satellites on the basis of the user location.

The image processor may preprocess the image captured through the image sensor to remove noise and a background.

The image processor may extract feature points from the preprocessed image to detect a building region.

The image processor may calculate a reference axis of an azimuth angle in the captured image by using the satellite signals, and calculate an azimuth angle range of each of the buildings on the basis of the reference axis.

The image processor may calculate distances from central coordinates of the captured image to the closest feature point among the feature points included in each of the buildings.

The processor may determine visibility of the satellites disposed up in the sky on the basis of the user location.

The processor may exclude a satellite signal transmitted from a satellite not secured in visibility, among the satellite signals used for calculating the user location, and calculate the user location again.

Further areas of applicability will become apparent from the description provided herein. It should be understood that the description and specific examples are intended for purposes of illustration only and are not intended to limit the scope of the present disclosure.

DRAWINGS

The above and other objects, features and advantages of the present disclosure will be more apparent from the following detailed description taken in conjunction with the accompanying drawings.

The drawings described herein are for illustration purposes only and are not intended to limit the scope of the present disclosure in any way.

DETAILED DESCRIPTION

Hereinafter, the exemplary forms of the present disclosure will be described in detail with reference to the accompanying drawings.

The present disclosure relates to an apparatus integrating a super wide angle camera and a global positioning system (GPS) receiver, which captures an image of a skyline around a vehicle using a super wide angle camera, calculates locations and heights of buildings around the vehicle from the captured image, excluding a satellite signal received from a satellite having poor visibility, and re-calculates a location of a user, thereby enabling accurate positioning even in a downtown area.

Figure 1:
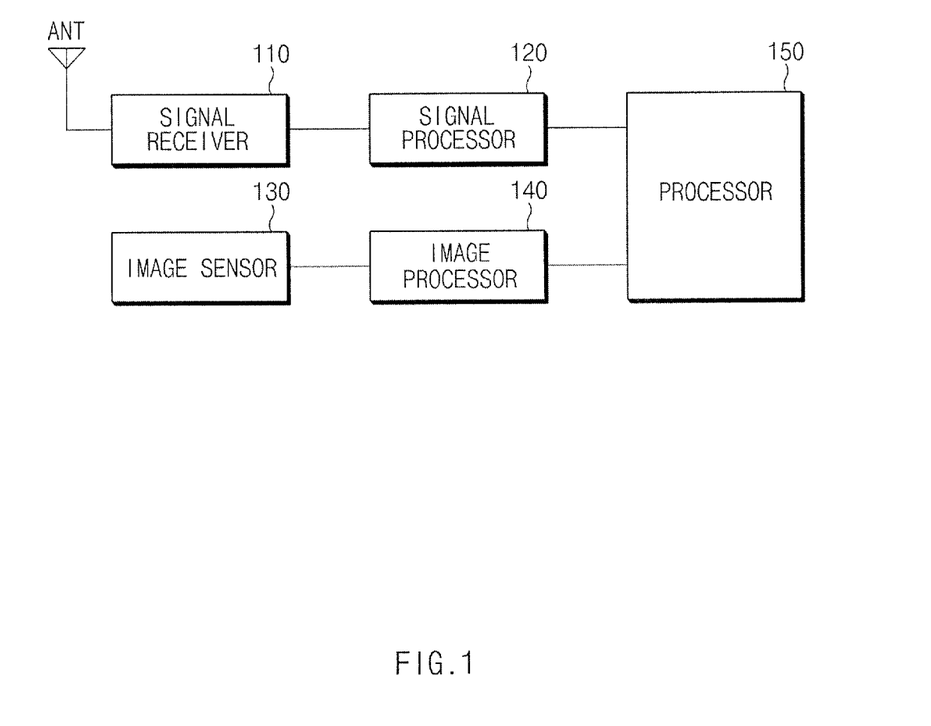
FIG. 1 is a block diagram of a positioning apparatus.
Figure 2:
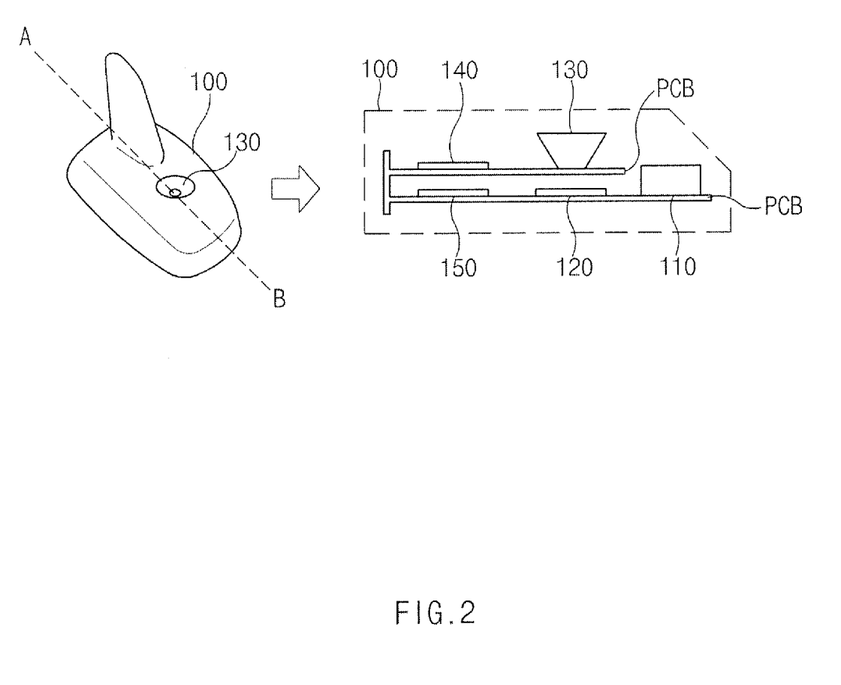
FIG. 2 is a cross-sectional view of the positioning apparatus.

FIG. 1 is a block diagram of a positioning apparatus, and FIG. 2 is a cross-sectional view of the positioning apparatus.

The positioning apparatus is installed within an external antenna device (a shark antenna) mounted on an outer portion (for example, a roof) of a vehicle, and includes a signal receiver 110, a signal processor 120, an image sensor 130, an image processor 140, and a processor 150.

In the present exemplary form, in order to reduce an area of the positioning apparatus, the aforementioned components are arranged and installed on two printed circuit boards (PCBs) disposed to be spaced apart by a predetermined distance in a vertical direction. For example, as illustrated in FIG. 2, the signal receiver 110, the signal processor 120, and the processor 150 are installed on any one of the two PCBs, and the image sensor 130 and the image processor 140 are installed on the other PCB. Here, since the signal receiver 110 needs to receive an external signal, the signal receiver 110 is disposed not to overlap other components thereon.

The signal receiver 110 includes an antenna ANT, and receives a satellite signal transmitted from a GPS satellite through the antenna ANT. Here, the signal receiver 110 may receive satellite signals transmitted from one or more GPS satellites.

The signal processor 120 processes satellite signals received through the signal receiver 110 to calculate the current location of a user (user location) and locations of the GPS satellites (satellite locations). Here, the satellite locations each include an azimuth angle and an elevation angle of the GPS satellites on the basis of the user location.

The image sensor 130 images a skyline around the vehicle. The image sensor 130 is implemented as super wide angle camera having a fish-eye lens (wide angle lens). As illustrated in FIG. 2, the image sensor 130 is installed to be perpendicular to the surface of the earth to obtain an image of the sky of the vehicle.

The image processor 140 preprocesses the image captured through the image sensor 130 to remove noise and a background (for example, sky) from the corresponding image. The image processor 140 calculates a location of each of buildings included in the captured image (image of the skyline) on the basis of the user location output from the signal processor 120, and calculates a height of each of the buildings through an image processing process based on the captured image.

The processor 150 determines visibility of the GPS satellites by using the user location, the satellite locations, and locations and heights of the buildings. In other words, the processor 150 calculates visibility of GPS satellites disposed in the sky on the basis of the current user location. The processor 150 may determine whether a satellite signal transmitted from a corresponding satellite is interrupted by a building by using the calculated visibility. Here, the processor 150 excludes a GPS satellite not secured in visibility among the GPS satellites used in the process of calculating an initial user location. That is, the processor 150 removes a poor satellite signal among the satellite signals used for calculating the initial user location. The processor 150 calculates again the user location with the other remaining satellite signals excluding the poor satellite signals of the GPS satellite not secured in visibility. In this manner, the user location is calculated by removing the poor satellite signal, among the satellite signals received through the signal receiver 110, and thus, the user location may be calculated more accurately.

Figure 3:
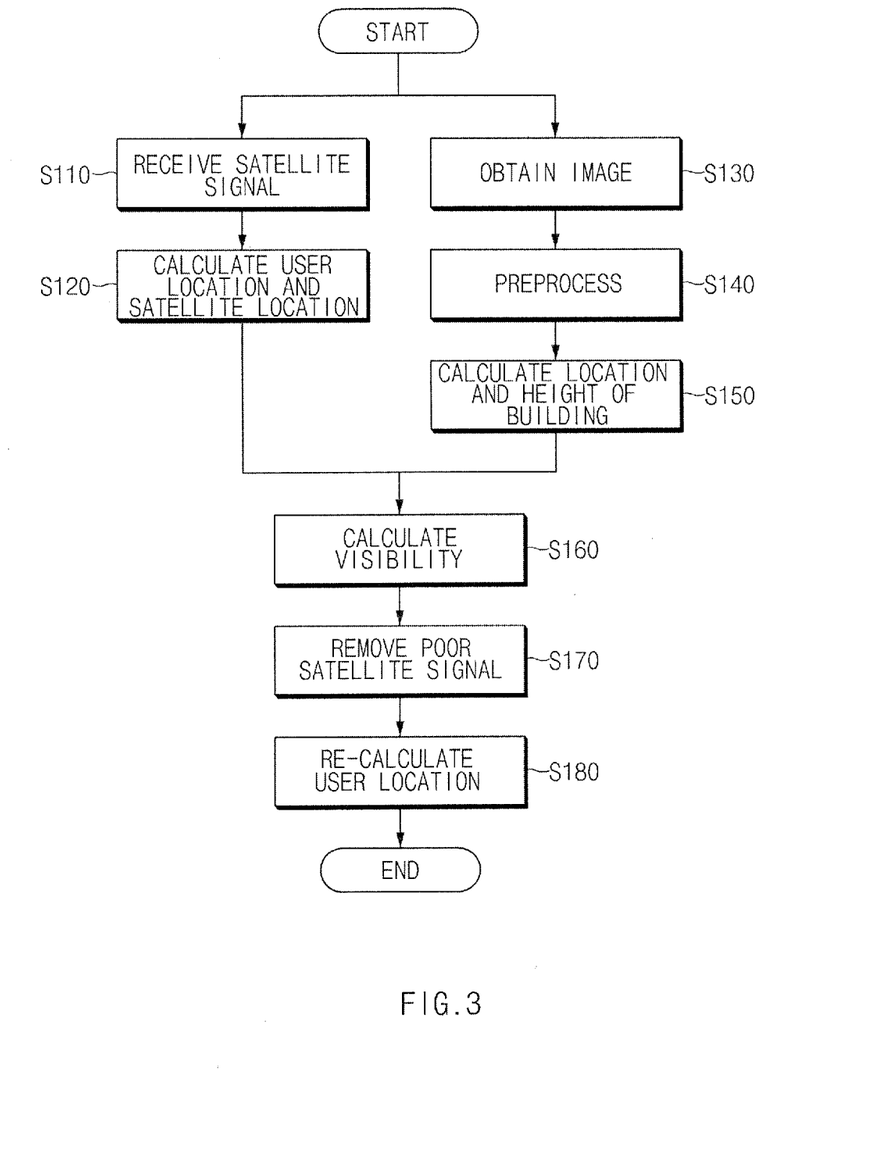
FIG. 3 is a flow chart illustrating a positioning method.

FIG. 3 is a flow chart illustrating a positioning method according to an exemplary form of the present disclosure.

First, the positioning apparatus receives satellite signals transmitted from GPS satellites through the signal receiver 110 in operation S110. The signal processor 120 of the positioning apparatus processes the received satellite signals to calculate a user location and locations of GPS satellites (satellite locations) in operation S120.

While the satellite signals are being received and processed, the positioning apparatus obtains an image of the sky of the vehicle through the image sensor 130 in operation S130. That is, the image sensor 130 captures an image of a sky line around the vehicle.

The image processor 140 of the positioning apparatus preprocesses the captured image through the image sensor 130 to remove noise and a background in operation S140.

The image processor 140 calculates a location of each of buildings included in the preprocessed image on the basis of the user location, and calculates a height of each of the buildings from the preprocessed image through an image processing process in operation S150.

The processor 150 of the positioning apparatus calculates visibility of GPS satellites located in the sky on the basis of the user location in operation S160. The processor 150 determines visibility of the GPS satellites on the basis of the user location, satellite locations, and locations and heights of the buildings.

The processor 150 removes a poor satellite signal among the satellite signals received through the signal receiver 110 on the basis of the visibility in operation S170. The processor 150 excludes a satellite signal transmitted from a GPS satellite not secured in visibility among the satellite signals used for calculating a previous user location.

The processor 150 re-calculates the user location by using the satellite signals remaining after the removal of the poor satellite signal in operation 5180.

Figure 4:
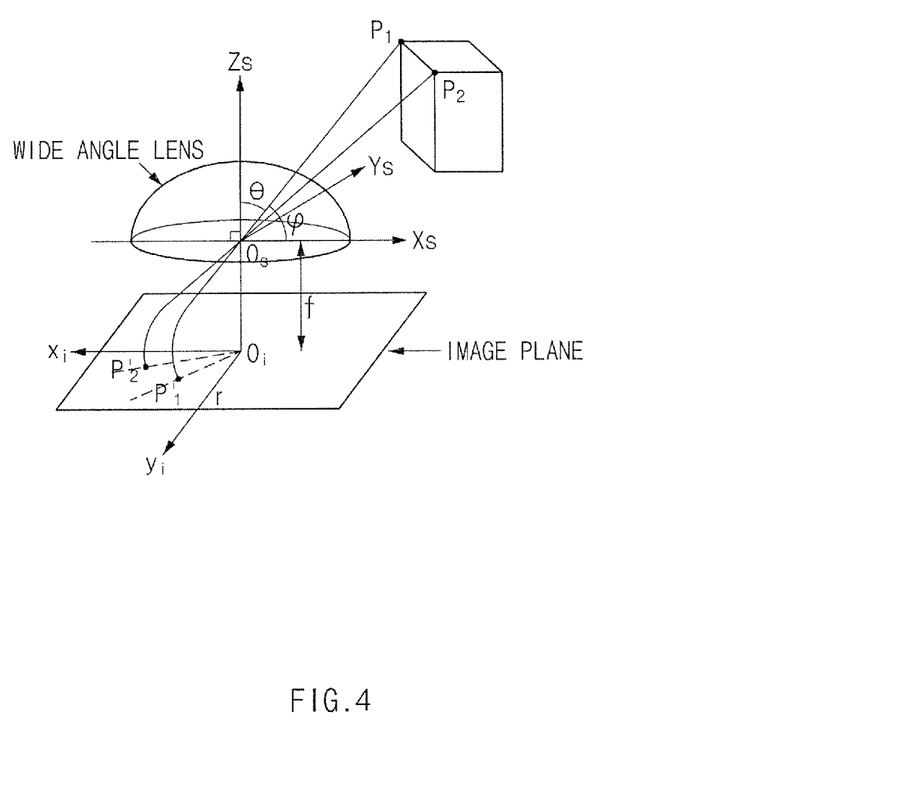
FIG. 4 is a view illustrating a principle of obtaining an image using a wide-angle lens.

FIG. 4 is a view illustrating a principle of obtaining an image using a wide-angle lens.

When an angle between a principle axis (Zs) of the camera and a certain point $P_n$ of a 3D space is $\theta$, a distance between $O_s$ and $O_i$ is f (focal length), and a distance between $O_i$ and a coordinate $P'_n$ projected on an image plane is r, a relational expression of Equation 1 below is established.

$$r = f \tan \theta \quad \text{[Equation 1]}$$

The image obtained thusly has a distorted form. The present disclosure proposes a method for determining a height and a location of an imaged building by using only the image obtained in the image plane, instead of obtaining a distorted model based on a camera lens.

Figure 5:
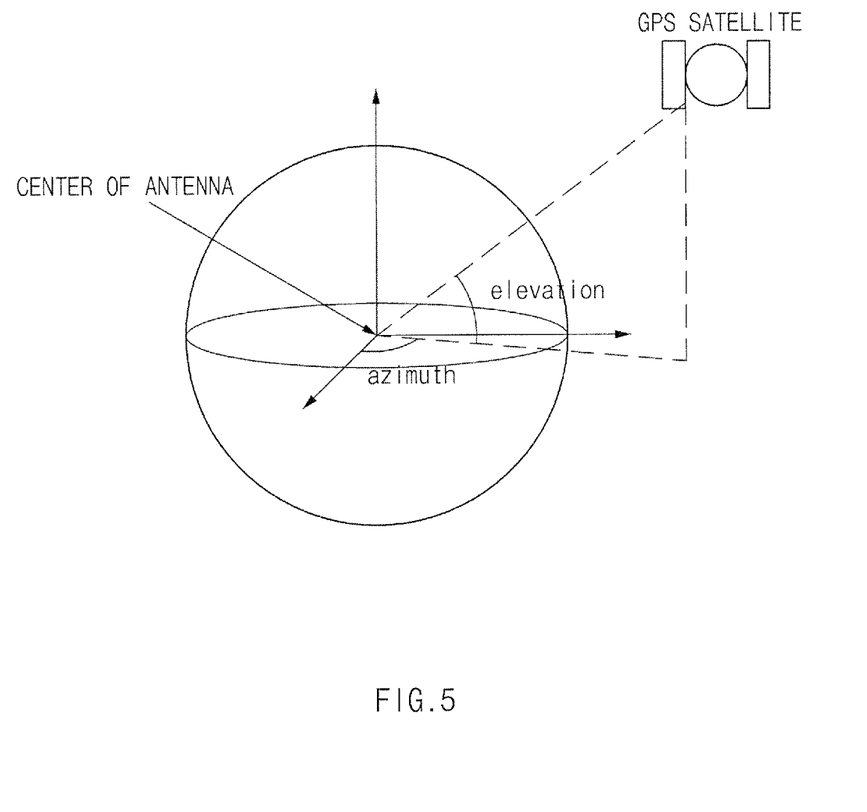
FIG. 5 is a view illustrating a geometrical relation between an antenna and a satellite.

FIG. 5 is a view illustrating a geometrical relation between an antenna and a satellite.

In general, a GPS satellite, when transmitting a satellite signal to the ground, transmits almanac data allowing for recognizing the orbit and a disposition state of the satellite at a predetermined interval.

Thus, a direction in which the satellite is present on the basis of the current user location (center of antenna) may be recognized using the information, and the direction of the satellite may be expressed by an azimuth angle and an elevation angle.

Figure 6:
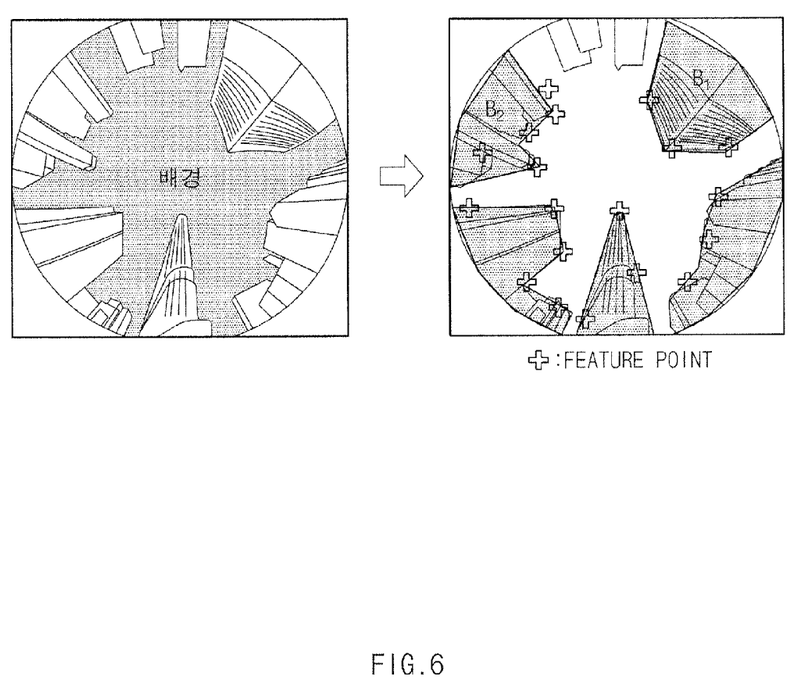
FIG. 6 is a view illustrating a process for preprocessing an image.

FIG. 6 is a view illustrating a process for preprocessing an image.

The image processor 140 extracts a background image, that is, a region (for example, sky), not a building, from the original image obtained through the wide-angle lens of the image sensor 130. The image processor 140 extracts feature points from the background-removed image. For example, the image processor 140 extracts corners of buildings, as feature points. Thereafter, the image processor 140 detects N number of segments (buildings) $B_n$ by performing a logic for detecting a building region. Here, the image processor 140 may remove feature points not included in the segments.

Figure 7:
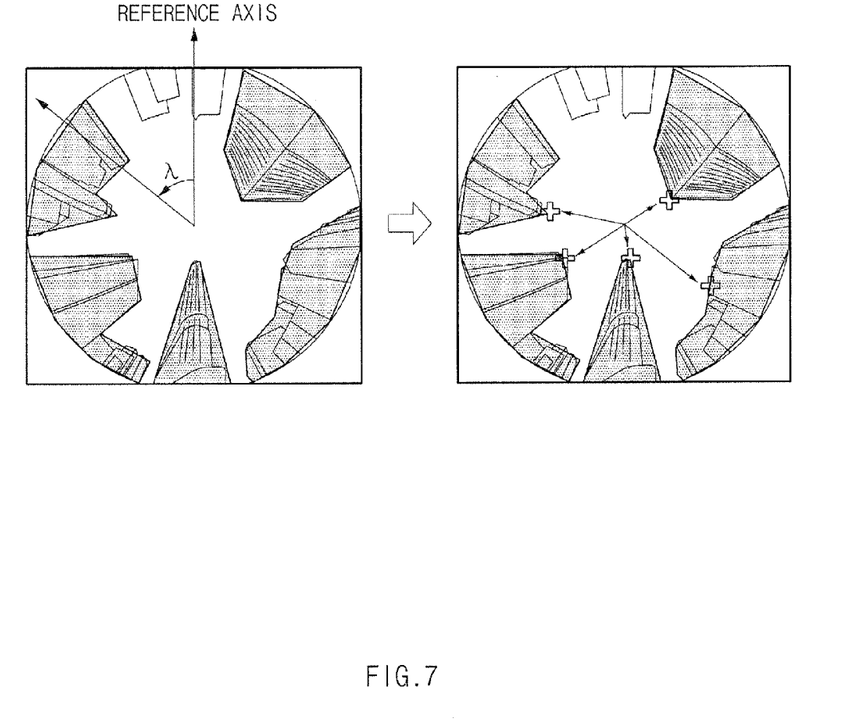
FIG. 7 is a view illustrating a method for calculating a location and a height of a building.

FIG. 7 is a view illustrating a method for calculating a location and a height of a building.

The image processor 140 calculates a reference axis of an azimuth angle by using satellite signals (GPS measurement values). The image processor 140 calculates an azimuth angle range (location) of each of the segments (buildings) by mapping the calculated reference axis of the azimuth angle to the image obtained through the image sensor 130.

Also, the image processor 140 calculates a height (an elevation angle) of each of the buildings. Here, the height (elevation angle) of each of the buildings is expressed as Equation 2 below, on the basis of Equation 1 and FIGS. 4 and 5.

$$\varphi = \frac{\pi}{2} - \tan^{-1}\left(\frac{r}{f}\right) \quad \text{[Equation 2]}$$

In Equation 2, r is a distance from central coordinates of the image to the closest feature point among the feature points included in each of the segments. That is, the image processor 140 extracts feature points of each of the segments having the shortest distance to the central coordinates.

Each of the segments ($B_1, \ldots, B_N$) has an azimuth angle range and elevation angle information. Each of the segments may be expressed as Equation 3 below.

$$B_1 = \{\lambda_{start,1} \lambda_{end,1} \varphi_1\}$$

$$B_2 = \{\lambda_{start,2} \lambda_{end,2} \varphi_2\}$$

$$\vdots$$

$$B_N = \{\lambda_{start,N} \lambda_{end,N} \varphi_N\} \quad \text{[Equation 3]}$$

Here, $\lambda_{start,N}$, $\lambda_{end,N}$ denote an azimuth angle range, and, $\varphi_N$ denotes an elevation angle.

Figure 8:
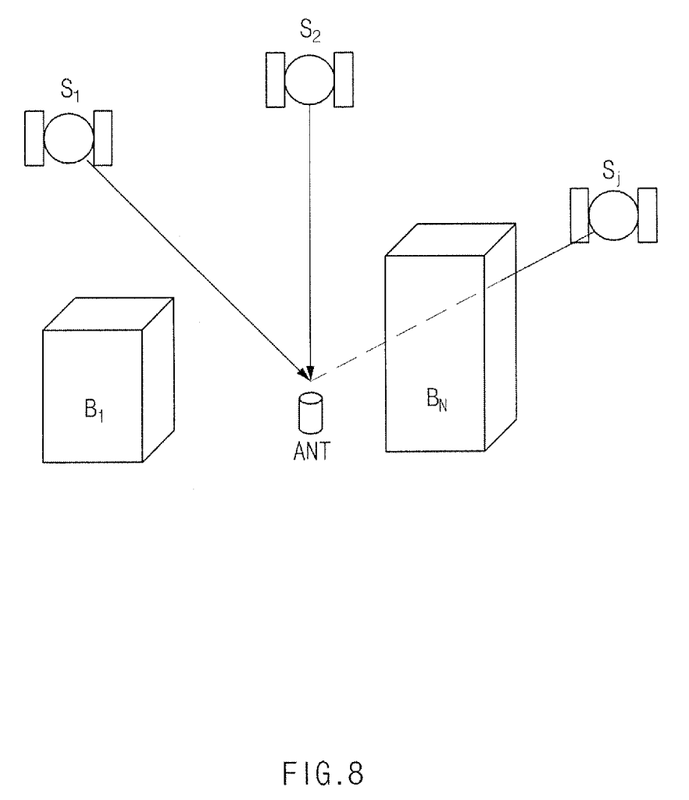
FIG. 8 is a conceptual view illustrating interruption of visibility due to a building.

FIG. 8 is a conceptual view illustrating interruption of visibility due to a building.

When it is assumed that j number of satellites ($S_1, S_2, \ldots, S_j$) are observed at the current location of the antenna, an azimuth angle and an elevation angle of a satellite may be recognized using almanac data as mentioned above. Thus, the following two conditional expressions are applied to each of the segments ($B_1, \ldots B_N$), and when one of the segments ($B_1, \ldots B_N$) meets the two conditional expressions, it is determined that a satellite signal thereof is interrupted by a building or that there is a great amount of signal errors.

$$\lambda_{start} \leq S_j^{azimuth} \leq \lambda_{end} \quad \text{Condition 1:}$$

$$S_j^{elevation} \leq \varphi \quad \text{Condition 2:}$$

Thus, when a user location is calculated again by using other remaining satellites after excluding the satellite satisfying the two conditions above, an error component is removed, resulting in calculation of a more accurate location.

According to the exemplary form described above, the positioning apparatus of the present disclosure estimates a location and a height of a building through an image processing process by using a super wide-angle camera additionally configured for capturing an image of a skyline of the downtown area. Thus, since the positioning apparatus of the present disclosure re-calculates a user location by excluding a satellite signal interrupted or interfered by a building, positioning accuracy may be enhanced.

Also, the positioning apparatus of the present disclosure operates in the same manner as that of an existing positioning apparatus (global navigation satellite system (GNSS)) in an open sky condition and calculates a user location by eliminating in advance an inaccurate satellite signal interrupted or reflected by a building in the downtown area in a compact mass of high-rise buildings, whereby more accurate location information may be obtained. In other words, since a cause of an error is removed in advance, high positioning accuracy may be obtained in any circumstances.

As described above, according to exemplary forms of the present disclosure, locations and heights of buildings around a vehicle are calculated, a satellite signal received from a satellite with poor visibility is excluded, and a user location is calculated again, whereby accurate positioning may be performed even in the downtown area.

Also, according to exemplary forms of the present disclosure, since accurate positioning is performed even in the downtown area, quality of various location-based services (LBSs) may be enhanced and the present disclosure may be utilized to draw a new concept application.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A positioning method for a vehicle comprising: receiving, with a signal receiver, satellite signals transmitted from satellites and capturing an image of a skyline around the vehicle through an image sensor; processing, by a processor, the satellite signals to calculate a vehicle location and satellite locations; calculating, by a processor, locations and heights of buildings included in the image captured by the image sensor based on the vehicle location; calculating, by a processor, visibility of the satellites by using the vehicle location, the satellite locations, and the locations and heights of the buildings; removing, by a processor, a poor satellite signal among the previously received satellite signals based on the calculated visibility; and re-calculating, by a processor, the vehicle location by using the other remaining satellite signals excluding the poor satellite signal.

2. The positioning method according to claim 1, further comprising: preprocessing, by a processor, the captured image to remove noise and a background image; and extracting, by a processor, feature points from the preprocessed image to detect a building region.

3. The positioning method according to claim 1, wherein the calculating of the locations and heights of the buildings comprises calculating a reference axis of an azimuth angle within the captured image using the satellite signals, and calculating an azimuth angle range of each of the buildings based on the reference axis.

4. The positioning method according to claim 1, wherein the calculating of the locations and heights of the buildings comprises calculating a respective distance from central coordinates of the captured image to the closest feature point among feature points included in each of the buildings.

5. The positioning method according to claim 1, wherein the calculating of visibility of the satellites comprises determining visibility of the satellites disposed up in the sky based on the vehicle location.

6. The positioning method according to claim 1, wherein the removing of a poor satellite signal comprises excluding a satellite signal transmitted from a satellite not secured in visibility among the satellite signals used for calculating the vehicle location.

7. A positioning apparatus comprising:
a signal receiver configured to receive satellite signals through an antenna;
a signal processor configured to calculate a user location and satellite locations by using the satellite signals;
an image sensor configured to capture an image of a skyline around the positioning apparatus;
an image processor configured to calculate locations and heights of buildings within the captured image based on the user location; and
a processor configured to calculate visibility of satellites by using the user location, the satellite locations, and the locations and heights of the buildings, remove a poor satellite signal from the received satellite signals based on the calculated visibility, and re-calculate the user location.

8. The positioning apparatus according to claim 7, wherein the image sensor is a super wide angle camera equipped with a wide angle lens.

9. The positioning apparatus according to claim 7, wherein the satellite locations include an elevation angle and an azimuth angle of their respective corresponding satellites based on the user location.

10. The positioning apparatus according to claim 7, wherein the image processor is configured to preprocess the image captured through the image sensor to remove noise and a background.

11. The positioning apparatus according to claim 10, wherein the image processor is configured to extract feature points from the preprocessed image to detect a building region.

12. The positioning apparatus according to claim 11, wherein the image processor is configured to calculate a reference axis of an azimuth angle in the captured image by using the satellite signals, and calculate an azimuth angle range of each of the buildings based on the reference axis.

13. The positioning apparatus according to claim 11, wherein the image processor is configured to calculate a respective distance from central coordinates of the captured image to the closest feature point among the feature points included in each of the buildings.

14. The positioning apparatus according to claim 7, wherein the processor is configured to determine visibility of the satellites disposed up in the sky based on the user location.

15. The positioning apparatus according to claim 7, wherein the processor is configured to exclude a satellite signal transmitted from a satellite not secured in visibility, among the satellite signals used for calculating the vehicle location, and calculate the user location again.

16. The positioning apparatus according to claim 7, wherein the imaging sensor is installed on a vehicle generally perpendicular to the surface of the earth.

* * * * *